US008898211B2

(12) United States Patent  
Johnston, II et al.

(10) Patent No.: US 8,898,211 B2
(45) Date of Patent: Nov. 25, 2014

(54) NON-DETERMINISTIC STATISTICAL DATA GENERATOR

(75) Inventors: Richard Fendall Johnston, II, County of Marion, OR (US); William J. Strauss, County of Polk, OR (US)

(73) Assignee: RAM International Corporation, Las Vegas, NV (US)

( * ) Notice: Subject to any disclaimer, the term of this patent is extended or adjusted under 35 U.S.C. 154(b) by 1334 days.

(21) Appl. No.: 12/996,747

(22) PCT Filed: May 9, 2008

(86) PCT No.: PCT/US2008/063228
§ 371 (c)(1), (2), (4) Date: Apr. 5, 2011

(87) PCT Pub. No.: WO2008/141167
PCT Pub. Date: Nov. 20, 2008

(65) Prior Publication Data
US 2011/0191399 A1 Aug. 4, 2011

Related U.S. Application Data

(60) Provisional application No. 60/917,096, filed on May 10, 2007.

(51) Int. Cl.
G06F 7/58 (2006.01)
(52) U.S. Cl.
CPC .................................... *G06F 7/588* (2013.01)

USPC ........................................... 708/250; 708/255
(58) Field of Classification Search
None
See application file for complete search history.

(56) References Cited

U.S. PATENT DOCUMENTS 5,031,130 A * 7/1991 Harada ......................... 708/250
6,253,223 B1 6/2001 Sprunk
7,080,106 B2 * 7/2006 Ikeda et al. ................... 708/250

FOREIGN PATENT DOCUMENTS

EP 2156282 1/2013

OTHER PUBLICATIONS

Supplementary European Search Report; Apr. 12, 2010.
Article: Murry, H.F.; A General Approach for Generating Natural Random Variables, IEEE Transactions on Computers, vol. C-19, No. 12, Dec. 1970; pp. 1210-1213.

* cited by examiner

Primary Examiner — Michael D Yaary
(74) Attorney, Agent, or Firm — Polster Lieder

(57) ABSTRACT

A method of generating non-deterministic and non-periodic random bits including the steps of providing a plurality of noise generators; providing a trigger based upon an outside world input; sampling the output signal of one of the noise generators upon the provision of the trigger; generating a first random number based upon the value of the sampled signal; and wherein the identity of the noise generator to be sampled is determined based upon a previous random number generated.

48 Claims, 4 Drawing Sheets

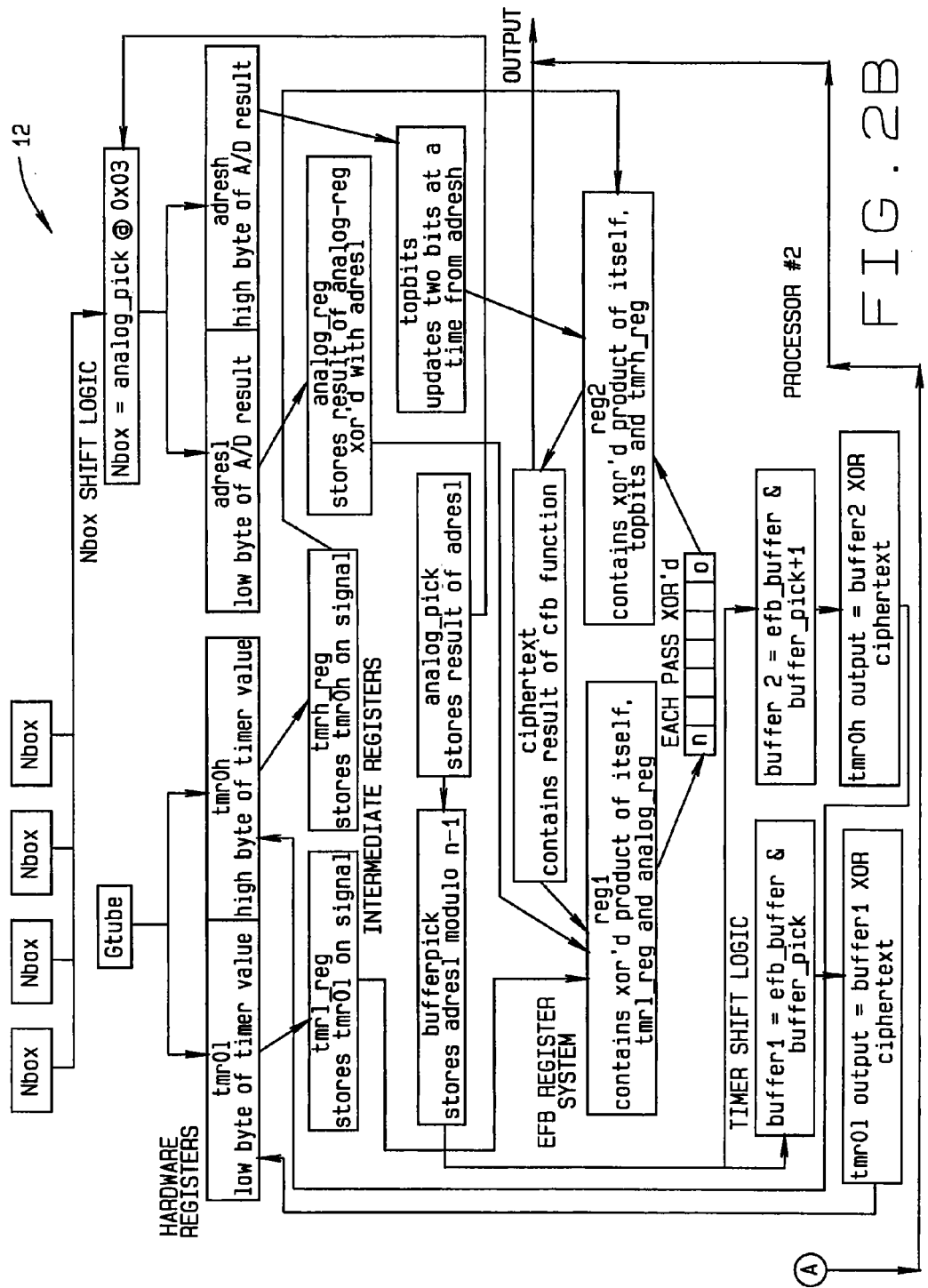

NON-DETERMINISTIC STATISTICAL DATA GENERATOR

CROSS REFERENCE TO RELATED APPLICATIONS

The present application is related to, and claims priority from, U.S. provisional Patent Application No. 60/917,096 filed on May 10, 2007, herein incorporated by reference.

FIELD OF THE INVENTION

The invention relates to non-deterministic statistical data generation. More specifically, the invention relates to a truly random, entropy generator.

BACKGROUND OF THE INVENTION

Non-deterministic data generation is an avid pursuit in science dating back one and a half centuries. In some scientific circles truly random data is considered to be a representation of the essence of life and matter itself. Clandestine techniques of capturing non-deterministic data although slow, are currently in practice in college courses ranging from the study of statistics to physics to the ebb and flow of tides and the mutation of genes throughout human evolution. As humankind further adapts the modern computer to aid in scientific study, the appetite for randomness increases proportionally.

When random numbers are pulled from truly non-deterministic data, they can be used in a wide range of business applications ranging from fair lotteries, stochastic studies in finance, poker machines and security applications for business.

In his famous quote on the subject of randomness, John von Neumann clearly states "Anyone who considers arithmetical methods of producing random digits is, of course, in a state of sin. For, as has been pointed out several times, there is no such thing as a random number—there are only methods to produce random numbers, and a strict arithmetic procedure of course is not such a method." John von Neumann, "Various techniques used in connection with random digits," in A. S. Householder, G. E. Forsythe, and H. H. Germond, eds., *Monte Carlo Method*, National Bureau of Standards Applied Mathematics Series, 12 (Washington, D.C.: U.S. Government Printing Office, 1951): 36-38.

Computers are purposely designed to be stateful machines. An average desktop computer today can execute 100 million instructions per second. Computer programs are fundamentally based on mathematical calculations. Producing truly random data from computer algorithms, no matter how tricky or seemingly complex the algorithm may be, is not possible. Computer programs are able to produce data that appears statistically random in every way and for some applications this pseudo-random data will suffice. Other applications require data to be truly random. Truly random data is distilled from truly random physical events. This distillation process need not be solely based upon "whitening" or software compensation for biased distribution. If captured from more than one type of physical source and in a plurality of each type of source, the entropy can be allowed to choose its own path in terms of random distribution. The strength of a random stream of bits of this nature is derived from the diversity of the origin of its seeds and the freedom of the seeds to interact with non-deterministic, non-periodic timing throughout the sampling process.

SUMMARY OF THE INVENTION

A method of generating non-deterministic and non-periodic random statistical data comprising the steps of providing a plurality of noise generators; providing a trigger based upon an outside world input; sampling the output signal of one of the noise generators upon the provision of the trigger; generating a first random number based upon the value of the sampled signal; and wherein the identity of the noise generator to be sampled is determined based upon a previous random number generated.

DESCRIPTION OF THE PREFERRED EMBODIMENT

Figure 1:
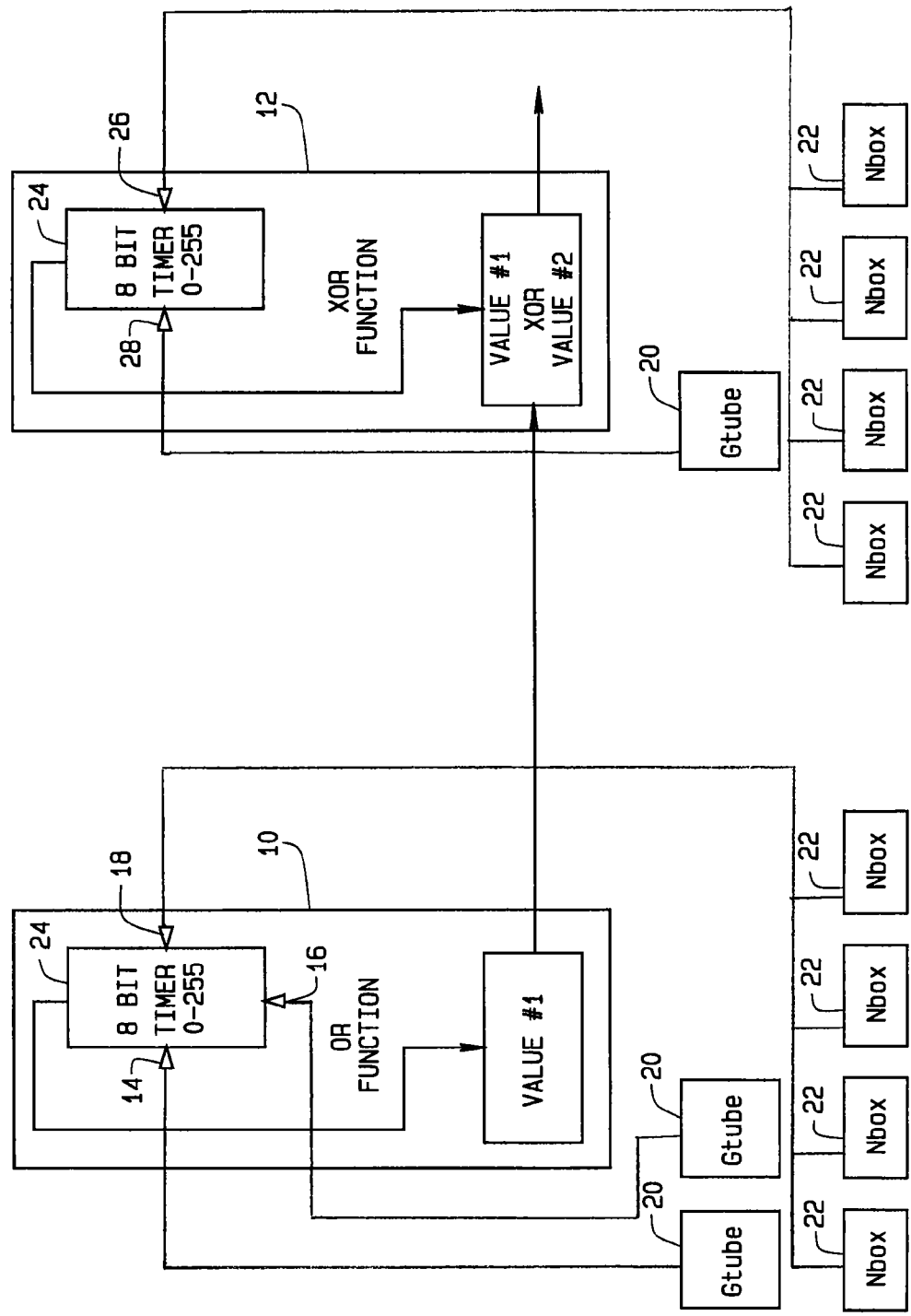
FIG. 1 is a generalized diagram of a preferred embodiment of the present invention.

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

The present invention comprises a method, system, and device for capturing statistically unbiased entropy using multiple non-deterministic, asynchronous sources, distilling random bits using microprocessors and multiple hashing algorithms, and distributing random bits for use by remote computer systems for any software process. In the preferred embodiment, the system employs three separate, electronic, asynchronous clocking mechanisms. Two of the separate, electronic, asynchronous clocking mechanisms comprise of gamma radiation detectors (Geiger Mueller counters). The two electronic, asynchronous clocking mechanisms serve as safeguards to provide the overall system with redundancy and added insurance that random bits selected are truly random and maintain non-deterministic qualities for the life span of the bits generated. The two electronic, asynchronous clocking mechanisms serve as triggers to start and stop the flow of entropy from multiple random noise generators in a non-deterministic fashion. A third electronic, asynchronous clocking mechanism may also be provided for changing the overall state of the system in a non-deterministic way thereby increasing the difficulty of guessing the state of the system at any given time.

In a preferred embodiment, the invention employs a plurality of random number generating elements and a plurality of random number sources. In addition, the disclosure contains a system of two interdependent microcontrollers to collect the data from the random number sources.

In that regard and referring to FIG. 1, there is provided a first processor 10 and a second processor 12. The first processor 10 comprises an eight bit timer 24 counting from 0-255. The processors 10 and 12 are preferably PICmicro 18F4xxx microcontrollers. The microcontrollers sample the noise generators using their on-board A/D converters and respond to interrupts generated by detected nuclear decay events.

Inputs 14-18 to the timer 24 are two Gtubes 20, which comprise Geiger Mueller tubes, and four Nboxes 22 which comprise semiconductor noise generators. It will be understood by one of ordinary skill in the in art that while the preferred embodiment is described with respect to Geiger Mueller tubes, any outside world input could be used in place of the Geiger Mueller counters, such as inputs from detected radio frequency or from various weather systems. The input could be from quantum or chaotic system. The Gtubes 20 are exposed to a radioactive isotope, preferably Cs-137 which is a primary beta emitter and secondary gamma emitter.

The Nboxes 22 preferably comprise eight zener diodes that are AC coupled to a high-gain operational amplifier with a gain of about 2000×. When a Gtube 20 detects a radioactive event, the other Gtube 20 is cancelled out by an OR function. Upon an event detection in one of the Gtubes 20, a value is sampled from the eight bit timer 24 and the value of the timer 24 is sent to the second processor 12.

The first processor samples a 10 bit value from one of the Nboxes 22, and the eight lowest bits are trimmed from the 10 bit value and become the next initial state of the timer 24.

The second processor 12 operates as with the first processor 10 except it comprises only a single Gtube 20, as the processor 12 is also responsible for forwarding random numbers to a requesting source. As a result, the timer 24 of the second processor 12 comprises only one input 26. Moreover, the values from the first processor 10 and the second processor 12 are passed through an XOR function to determine whether a random number from the first processor 10 or the second processor 12 will be output.

Figure 2A:
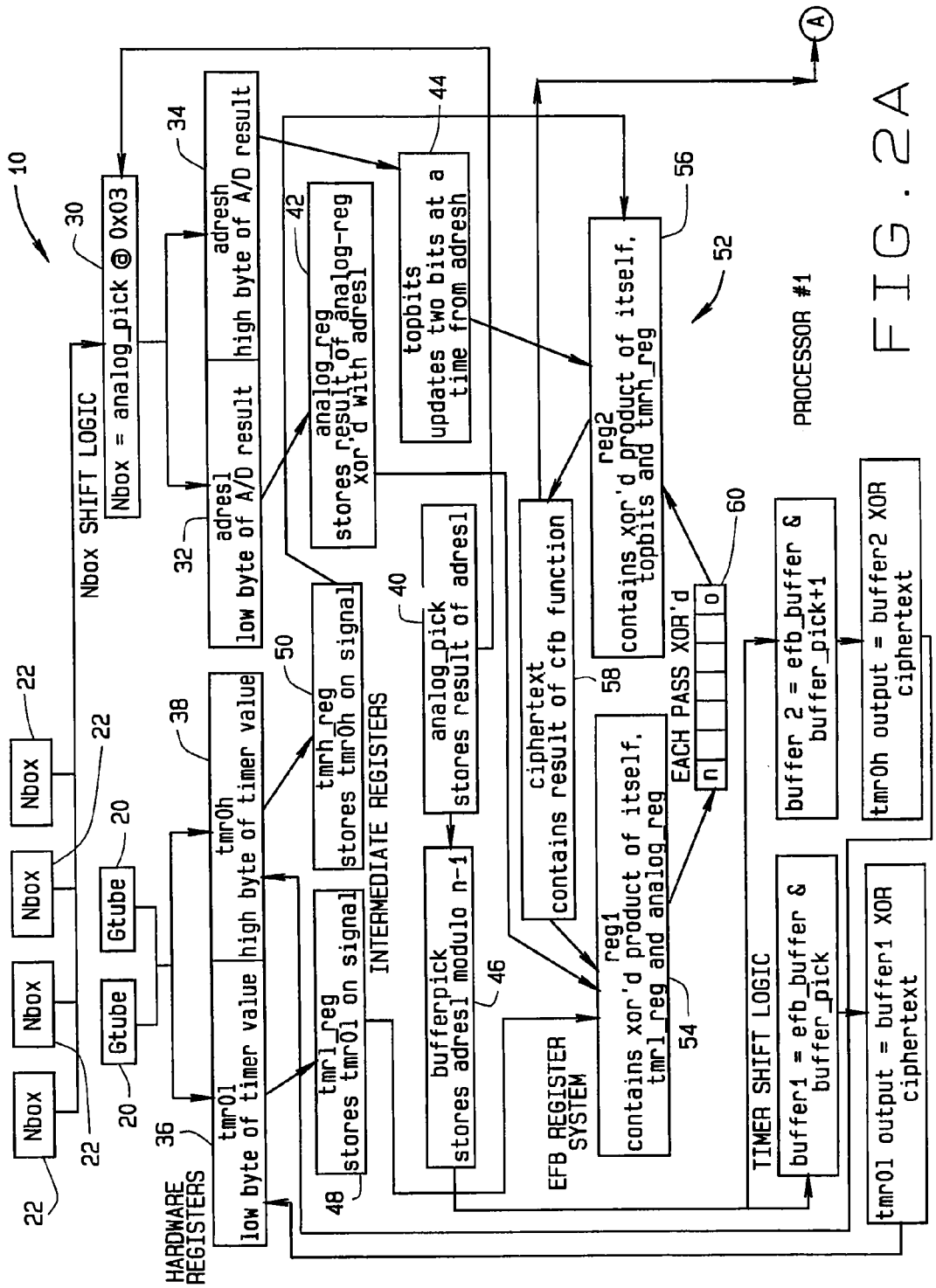
FIG. 2 is a detailed diagram of a preferred embodiment of the present invention.

An embodiment of the present invention is shown in even greater detail in FIG. 2. The four Nboxes 22 of the first processor 10 all supply analog random noise signals to an Nbox shift logic 30, which determines which of the Nbox outputs will be used by the first processor 10, and samples and converts the analog signal to a 10 bit digital value. The lower 8 bits of the sampled analog signal are stored at adresl 32 and the top two bits are stored at adresh 34. The top byte, adresh 34, contains only two bits, but is still referenced as a byte with the top six bits always equal to zero.

The Gtubes 20 utilizes a timer, known as tmr0 in the graphic, whose current state is stored as a sixteen bit value available as two bytes, tmr0$h$ 36 and tmr0$l$ 38.

The Nbox shift logic 30 continuously samples data from the four Nboxes 22, one at a time. The Nbox 22 to be selected as the next source is determined by the bottom two bits of the previous result.

Several registers are assigned values by the Nbox shift logic 30. analog-pick 40 assumes the verbatim value of adresl 32, and this register is used to pick the next Nbox 22 source, as discussed above. analog-reg 42 stores the xored product of itself and adresl 32. topbits 44 is an 8-bit register that updates two bits at a time from adresh. buffer-pick 46 takes the value of adresl 32. A modulus operation is then performed to produce a value between zero and BUF-LEN minus 1, as described below.

Upon the low to high signal of a Gtube 20, the first processor 10 immediately interrupts what it is doing and records the corresponding timer values in to tmrl-reg 48 and tmrh-reg 50. In this manner, the Gtube 20 logic works asynchronously to update its state. They update their state via the timer shift logic. tmr0$l$ 30 updates via tmr0$l$_output xor'd ciphertext, while tmr0$h$ 50 is updated by tmr0$h$_output xor'd with ciphertext. After the timer values, tmr0$l$ 36 and tmr0$h$ 38 are stored, they are randomized using analog-reg 42 xored with two contingent bytes (one for each register) that is referenced by buffer-pick 46. The first byte is at the location described by buffer-pick 46, the second byte pulled from the previous location.

The EFB register system 52 contains a register that holds limited number of transformed previous outputs. The length of this register is determined by the constant BUF_LEN. The EFB 52 is updated after every new adresl 32 and adresh 34 result. The EFB 52 does not depend on a new Geiger value, as one can never be guaranteed.

The EFB 52 utilizes three registers and one buffer. The registers are named reg1 54, reg2 56, and ciphertext 58. The data moves in a circular manner and is transformed on each cycle, unless it is held in buffer 60. reg1 54 and reg2 56 are used to transform data that is moving through the cycle, reg1 54 contains the xored product of itself, tmrl_reg 48 and analog_reg 42. reg2 56 contains the xored product of itself, tmrh_reg 50 and topbits 44. ciphertext 58 is the output register. The data flow starts with the byte contained in the end of the buffer 60. This byte is xored with reg2 56 and stored in ciphertext 58. ciphertext 58 is then xored with reg1 54 and stored in the beginning of the buffer.

In FIG. 2, the second processor 12 operates in the same manner as the first processor 10 except that only a single Gtube 20 is preferably used in the second processor 12 and the second processor receives the output of the first processor 10 as an input and XORs the output of the first processor 10 with the output of the second processor 12 and outputs the result.

Figure 3:
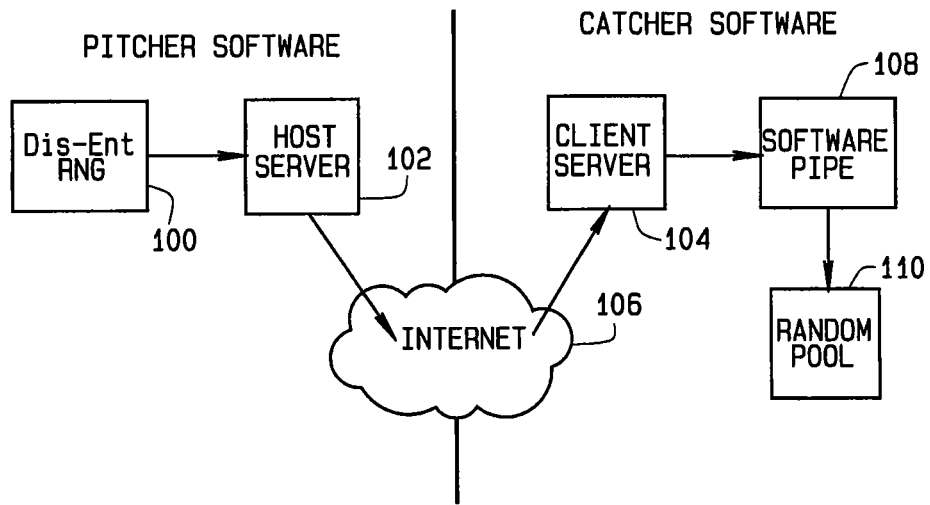
FIG. 3 is a diagram of a system incorporating a non-deterministic statistical data generator for delivered non-deterministic statistical data to a client computer located remotely from the non-deterministic statistical data generator and for storage by the client for use at a later time in accordance with an embodiment of the invention.

In FIG. 3, the random number generating device described above is shown diagrammatically as reference numeral 100. The non-deterministic statistical data generator 100 communicates with a host server 102 which delivers non-deterministic statistical data to various client server 104 who request non-deterministic statistical data through a local or wide area network 106, such as the internet. Software 108 then stores the received non-deterministic statistical data in a random pool 110 until they are requested.

The transmission of random data is accomplished using a standard RS232 serial interface. The baud rate on the interface is preferably variable between 1.2 Kb/s to 230 Kb/s.

The second half of the Invention is a separate, single board, embedded computer that serves as a dedicated host. The host collects the raw entropy from the invention and uses this stream in conjunction with an arbitrary symmetric-key cipher in CBC mode. Based upon the raw data a key is derived and an arbitrary amount of data is collected and encrypted. Also based upon the raw data is a value known as the compounding factor. This value is arbitrary. For the reference design this value can be any whole number between 0 and 31, inclusive. The use of the compounding factor is implemented by recycling previous states of the entropy pool for the number of times the value holds. Each compounding is performed by a rekeying of the cipher, the collection of original data, and the encryption of both the original data and the previous state of the machine. After the number of iterations equals that of the compounding factor, the internal state of the program is reinitialized and the previous state is flushed.

When transmitting data to its clients, the server 102 maintains a series of interrelated entropy pools. No one pool can contain a contiguous set of data generated by the non-deterministic statistical data generator 100. Instead, blocks for each pool are sampled non-deterministically using raw data from the non-deterministic statistical data generator 100. The blocks are also transmitted out of order. In effect, no one (or n multiples) of users can effectively reconstruct the data and extrapolate any usable structure from the data. The mechanism is designed to make it impossible to determine to any degree of certainty what state the machine was in when the entropy was produced.

A non-deterministic statistical data generator according to the preferred embodiment can supply 100 servers enough entropy to generate at least 359,424 128 bit non-deterministic integers per server per 24-hour period.

In an alternative embodiment, the design splits the single printed circuit board of the first embodiment into 2 separate boards. A first board acts as an instrumentation board and comprises two noise generators, for example Geiger counters, rather than the eight noise generators of the first embodiment. By reducing the number of noise generators, faster sampling rates and processing speeds are achieved. In the second embodiment, many more asynchronous elements can easily be added when needed and in this way, the new design is modular. The second printed circuit board is the processor board. It uses one processor rather than two as in the first embodiment. The processor board handles the data coming in from the instrumentation board and treats the data in a mathematically optimized manner as described in the first embodiment. When data is ready for output, the data is carried over a single 10/100 Ethernet port at a rate of about 6-7 megabits per second.

Figure 4:
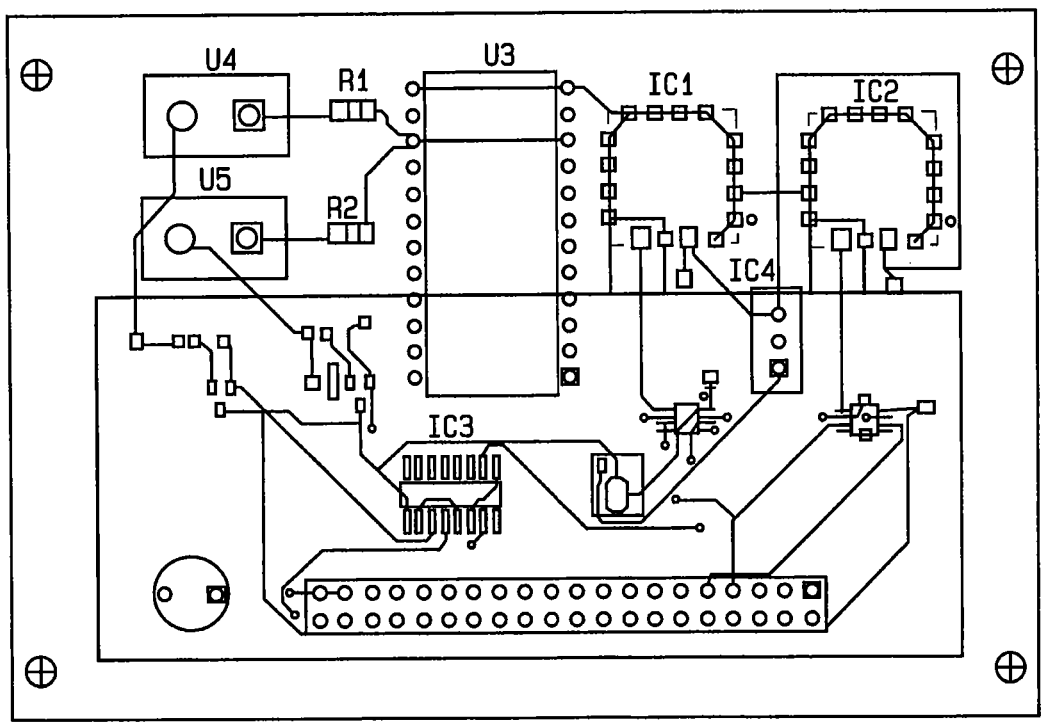
FIG. 4 is a circuit diagram of the construction of a device according to an embodiment of the present invention.

An exemplary device according to the present invention may be constructed from the embodiment shown in FIG. 4 with the components described below.

| Qty | RefDes | Part # | Description | Package | Type |
|---|---|---|---|---|---|
| 2 | R1, R2 | 263-10M-RC | Xicon 1206 Resistor 10 MΩ | "1206" | SMT |
| 2 | C1, C2 | 0603YC105KAT2A | AVX 0603 Ceramic 1.0 uF | "0603" | SMT |
| 1 | IC3 | MC14049UBDR2G | ON Semi 4049 Inverter | SOIC-16 | SMT |
| 2 | Q1, Q2 | BCW66G | Fairchild Transistor | SOT-23 | SMT |
| 2 | R5, R6 | CRCW0603100KJNEA | Vishay 0603 100K | "0603" | SMT |
| 1 | U7 | AP1117Y33L-13 | Diodes Inc 3.3 V Lin Reg | SOT-89 | SMT |
| 4 | C4, C5, C6, C7 | C2012X5R1A225K | TDK 0805 Ceramic 2.2 uF | "0805" | SMT |
| 1 | IC4 | MC7812AECT | Fairchild 12 Lin Reg | TO-220 | Thru |
| 2 | R3, R4 | RK73H2ATTD4703F | KOA 0805 470 KΩ | "0805" | SMT |
| 1 | U3 | 4824-6000-CP | 3M 24 pin DIP Socket | DIP24 | Thru |
| 1 | J1 | 90130-1240 | Molex 40 Pin C-Grid Header | Thru | Thru |
| 2 | U1, U2 | AD7276BRM | Analog Device A/D | MSOP-8 | SMT |
| 2 | IC1, IC2 | SMN7103H | Micronetics Noise Gen | Atypical | Leadless |

The above examples show that the invention, as defined by the claims, has far ranging application and should not be limited merely to the embodiments shown and described in detail. Instead the invention should be limited only to the explicit words of the claims, and the claims should not be arbitrarily limited to embodiments shown in the specification. The scope of protection is only limited by the scope of the accompanying claims, and the Examiner should examine the claims on that basis.

We claim:

1. A method of generating non-deterministic and non-periodic random bits comprising the steps of:
    providing a first plurality of noise generators having different sources, each source comprising a second plurality of noise generators for each source, the first and second plurality of noise generators having concurrent output signals;
    providing a trigger based upon an outside world input;
    selecting and sampling the output signal of one of the noise generators upon the provision of the trigger;
    generating a first random number based upon the value of the sampled signal; and
    wherein the identity of the noise generator to be sampled is determined based upon a previous random number generated.

2. The method of claim 1 wherein the outside world input is the detection of radiation.

3. The method of claim 2 wherein the step of providing a trigger based upon the detection of radiation is performed with a Geiger Mueller counter.

4. The method of claim 3 wherein analog output of the Geiger Mueller counter is converted to a binary number through digital sampling.

5. The method of claim 3 wherein the Geiger Mueller counters are exposed to Cs-137.

6. The method of claim 1 wherein one of the first and second plurality of noise generators comprise semiconductor noise generators.

7. The method of claim 6 wherein the semiconductor noise generators comprise zener diodes.

8. The method of claim 7 wherein the zener diodes have a gain of about 2000×.

9. The method of claim 1 wherein the outside world input is the detection a radio frequency event.

10. The method of claim 1 wherein the outside world input is the detection a characteristic of a weather system.

11. The method of claim 1 wherein the trigger is determined by a single detector of the outside world input.

12. The method of claim 1 wherein the trigger is determined by a plurality of detectors of the outside world input.

13. The method of claim 12 further comprising the step of, when one of the triggers detects a triggering event, canceling out the other of the plurality of triggers.

14. The method of claim 13 further comprising the step of, when one of the triggers detects a triggering event, sampling a value from a timer.

15. The method of claim 14 wherein a portion of a sampled value of at least one of the first and second plurality of noise generators is used as the next initial state of the timer.

16. The method of claim 15 wherein the lowest eight bits of the sampled value of at least one of the first and second plurality of noise generators is used as the next initial state of the timer.

17. A method of generating non-deterministic and non-periodic random bits comprising the steps of:
    providing a first plurality of noise generators having different sources, each source comprising a second plurality of noise generators for each source, the first and second plurality of noise generators having concurrent output signals;

providing a trigger based upon an outside world input;

selecting and sampling the output signal of one of the first and second plurality of noise generators upon the provision of the trigger;

generating a first random number based upon the value of the sampled signal;

wherein the identity of the noise generator to be sampled is determined based upon a previous random number generated;

providing a third plurality of noise generators having different sources and a fourth plurality of noise generators for each of said different sources, the third plurality of noise generators having concurrent output signals;

providing a second trigger based upon an outside world input;

selecting and sampling the output signal of one of the third plurality of noise generators upon the provision of the second trigger;

generating a second random number based upon the value of the sampled signal; and selecting from the first and second random numbers an output random number.

18. The method of claim 17 wherein the outside world input is the detection of radiation.

19. The method of claim 18 wherein the step of providing a trigger based upon the detection of radiation is performed with a Geiger Mueller counter.

20. The method of claim 19 wherein analog output of the Geiger Mueller counter is converted to a binary number through digital sampling.

21. The method of claim 19 wherein the Geiger Mueller counters are exposed to Cs-137.

22. The method of claim 17 wherein at least the first plurality of noise generators comprise semiconductor noise generators.

23. The method of claim 22 wherein the semiconductor noise generators comprise zener diodes.

24. The method of claim 23 wherein the zener diodes have a gain of about 2000×.

25. The method of claim 17 wherein the outside world input is the detection of a radio frequency.

26. The method of claim 17 wherein the outside world input is the detection of a characteristic of a weather system.

27. The method of claim 17 wherein the trigger is determined by a single detector of the outside world input.

28. The method of claim 17 wherein the trigger is determined by a plurality of detectors of the outside world input.

29. The method of claim 28 further comprising the step of, when one of the triggers detects a triggering event, canceling out the other of the plurality of triggers.

30. The method of claim 29 further comprising the step of, when one of the triggers detects a triggering event, sampling a value from a timer.

31. The method of claim 30 wherein a portion of a sampled value of the noise generator is used as the next initial state of the timer.

32. The method of claim 31 wherein the lowest eight bits of the sampled value of the noise generator is used as the next initial state of the timer.

33. An apparatus for generating non-deterministic and non-periodic random bits comprising:

a first plurality of noise generators having different sources, each source comprising a second plurality of noise generators for each source, the first and second noise generator plurality arranged to provide concurrent outputs;

a trigger that generates an output based upon an outside world input;

a processor that selects and samples the output signal of one of the noise generators upon the provision of the trigger and generates a first random number based upon the value of the sampled signal and determines the identity of the noise generator to be sampled based upon a previous random number generated.

34. The apparatus of claim 33 wherein the outside world input is the detection of radiation.

35. The apparatus of claim 34 wherein the step of providing a trigger based upon the detection of radiation is performed with a Geiger Mueller counter.

36. The apparatus of claim 35 wherein the processor converts the analog output of the Geiger Mueller counter to a binary number by digital sampling.

37. The apparatus of claim 35 further comprising Cs-137.

38. The apparatus of claim 33 wherein the noise generators comprise semiconductor noise generators.

39. The apparatus of claim 38 wherein the semiconductor noise generators comprise zener diodes.

40. The apparatus of claim 39 wherein the zener diodes have a gain of about 2000×.

41. The apparatus of claim 33 wherein the trigger detects a radio frequency.

42. The apparatus of claim 33 wherein the trigger detects a characteristic of a weather system.

43. The apparatus of claim 33 wherein the trigger comprises a single detector of the outside world input.

44. The apparatus of claim 33 wherein the trigger comprises a plurality of detectors of the outside world input.

45. The apparatus of claim 44 further comprising means for cancelling the remainder of the triggers when a trigger detects a triggering event.

46. The apparatus of claim 45 wherein the processor, when one of the triggers detects a triggering event, samples a value from a timer.

47. The apparatus of claim 46 wherein a portion of a sampled value of the noise generator is used as the next initial state of the timer.

48. The apparatus of claim 47 wherein the lowest eight bits of the sampled value of the noise generator is used as the next initial state of the timer.

* * * * *